United States Patent [19]
Reed, Jr. et al.

[11] 3,939,917
[45] Feb. 24, 1976

[54] SPIKER BLADE

[75] Inventors: E. Smith Reed, Jr., Deephaven; David J. Scherbring, Richfield, both of Minn.

[73] Assignee: The Toro Company, Minneapolis, Minn.

[22] Filed: May 28, 1974

[21] Appl. No.: 473,745

[52] U.S. Cl. ................................ 172/555; 172/765
[51] Int. Cl.² ................................ A01B 21/02
[58] Field of Search ........... 172/555, 556, 554, 540, 172/21, 119, 122, 123, 765, 604, 548, 42; 111/89

[56] References Cited
UNITED STATES PATENTS

| | | | |
|---|---|---|---|
| 2,730,856 | 1/1956 | Mekalainas | 172/556 X |
| 2,881,848 | 4/1959 | Liston | 172/555 |
| 3,140,677 | 7/1964 | Fraser | 172/42 X |

Primary Examiner—Stephen C. Pellegrino
Attorney, Agent, or Firm—Merchant, Gould, Smith, Edell, Welter & Schmidt

[57] ABSTRACT

A spiker blade for use on a turf spiker assembly to break and ventilate a ground surface thereby facilitating penetration of air, water and nutrient through the surface. The spiker blade has a tooth profile with a trailing edge having a counterdepression segment. The counterdepression segment functions to create a ground surface depression into which ruffled material kicked up by the tooth during spiking may be deposited. As a result, the ground surface after spiking has taken place is maintained relatively smooth with an unruffled appearance.

9 Claims, 4 Drawing Figures

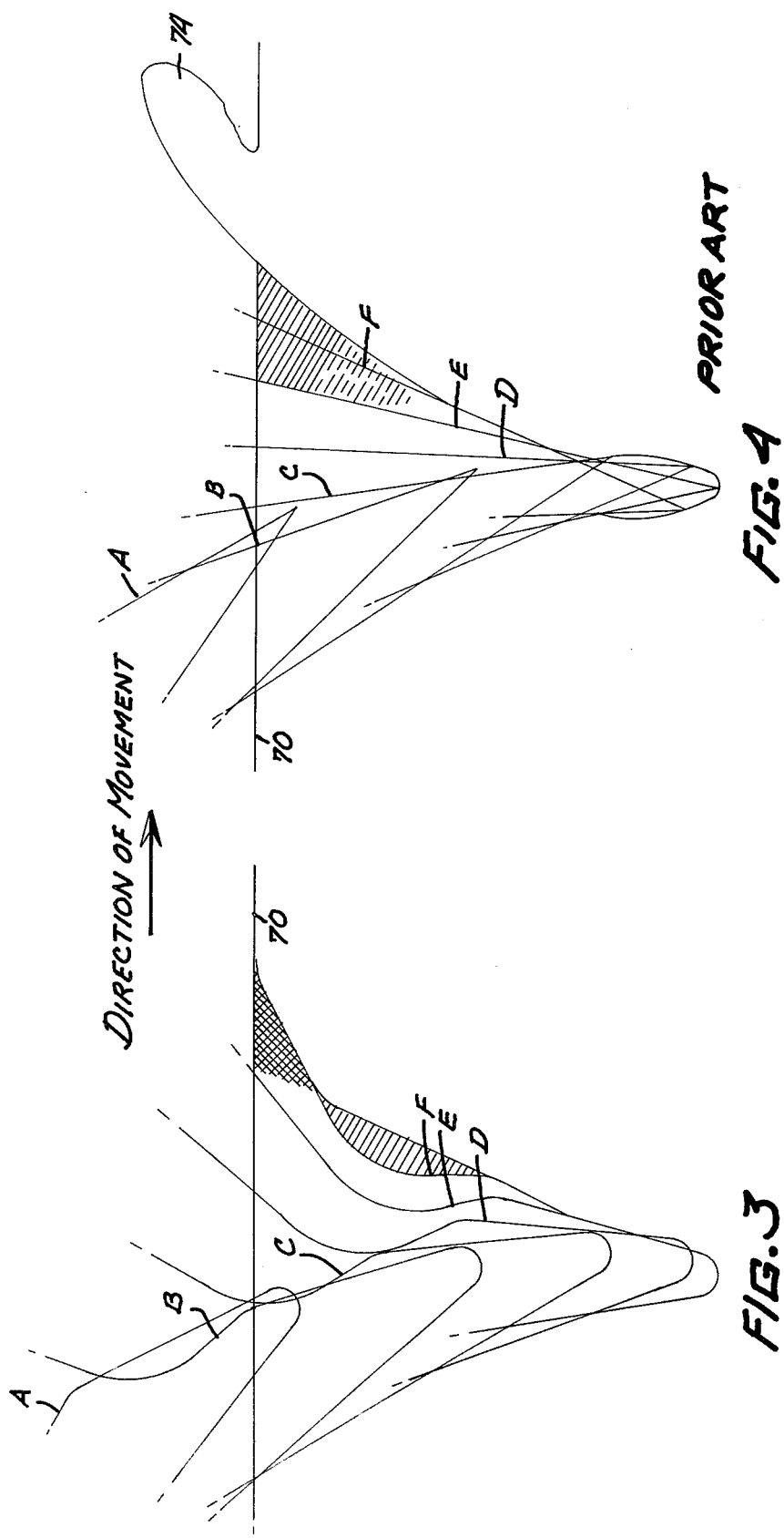

SPIKER BLADE

BACKGROUND OF THE INVENTION

This invention relates generally to turf care equipment and more particularly concerns an improved blade for a turf spiker for aerating turf and reducing surface filming effects.

By way of background, a turf spiker is a device which creates small cross-sectional area, relatively deep holes in a turf ground surface to allow air, moisture and other elements to penetrate the ground surface. The spike holes reduce surface filming effects and stimulate the growth of desirable grasses in the turf. One of the primary uses for a turf spiker is for spiking of golf course greens.

Because of heavy demand for continuous play on golf courses, it is highly desirable to have turf care equipment which conditions the turf without substantially interfering with play. This has been a drawback of prior turf spikers. Prior art turf spikers have had what might be referred to as a star-shaped blade. The individual teeth of the blade have generally been substantially symmetrical about a line from the tooth tip to the axis of rotation of the blade. In general the leading and trailing edges of each tooth in prior art spiker blades have been straight line segments so that the portion of the blade penetrating the ground surface has been V-shaped. This type of prior art blade may be referred to for simplicity as a "straight" star-wheel blade.

In turf spiking apparatus using the straight star-wheel blade at a setting at which the blade penetrates any substantial percentage of its radius, say greater than ten percent, a great deal of dirt, turf and other materials are lifted out of the spiker hole by the spiker blade and deposited forward of the spiker hole above the existing ground surface. This leaves a ruffled, unsightly appearance on the turf, especially on golf course greens. It also renders a green spiked with such a blade annoying and almost impossible to use for its intended purpose by golfers for a substantial time period after spiking of the green with such a blade occurs.

The present invention is a spiker blade which accomplishes the important function of aerating and penetrating the ground surface but is capable of doing so without undesirable "ruffling" that is, deposit of substantial amounts of turf and dirt above the ground surface resulting from the spiking process. Thus after use of the turf spiker of the present invention for aeration of the green, the green surface has a relatively smooth, unruffled appearance which allows use of the green for putting immediately after the spiking operation has occurred.

Furthermore, prior art turf spikers using traditional spiker blade configurations may be fitted with the present invention to enable them to eliminate the substantial shortcomings of prior art devices.

SUMMARY OF THE INVENTION

In accordance with the invention, a spiker blade adapted for mounting on the rotatable shaft of a turf spiker is provided. The spiker blade is configured with a plurality of teeth spaced about its periphery. Each of the teeth has a profile defined by its leading and trailing edges. The leading and trailing edges of the profile meet to form a tooth tip. The trailing edge of each tooth has a piercing segment leading upward from the tooth tip. Together with the entrance edge opposite the piercing segment these segments form a narrow tapered profile proximate the tip. Above the piercing segment on the trailing edge is a counterdepression segment directed at a substantially larger angle to said leading edge than said piercing segment.

In opeation, the spiker blade will be mounted to penetrate to depth so that the counterdepression segment comes into contact with the ground surface during spiking thereof. The counterdepression segment forms a counterdepression in the turf slightly in front of the normal area swept out by the piercing segment of the blade. This allows material lifted upward by the piercing segment to be deposited in the counterdepression below ground level, leaving virtually no ruffling above ground level.

In certain embodiments of the invention, the blade teeth will include an undercut segment separating the piercing and counterdepression segments of the trailing edges, the undercut segment sweeping out a lesser volume during spiking, therefore drawing less dirt, turf, and other material forward and upward during the spiking operation than would be lifted by a tooth without an undercut.

BRIEF DESCRIPTION OF THE DRAWING

Additional desirable features and advantages of the invention will become apparent upon particular reference to the drawings and detailed description which follow, in which:

FIGS. 3 and 4 respectively are sectional, partially subterranean representations showing successive positions of a spiker blade tooth constructed according to the present invention and a conventional spiker blade tooth during turf spiker operation, and illustrating the effect of each on the ground surface as well as resultant migration of material.

Figures 1, 2:
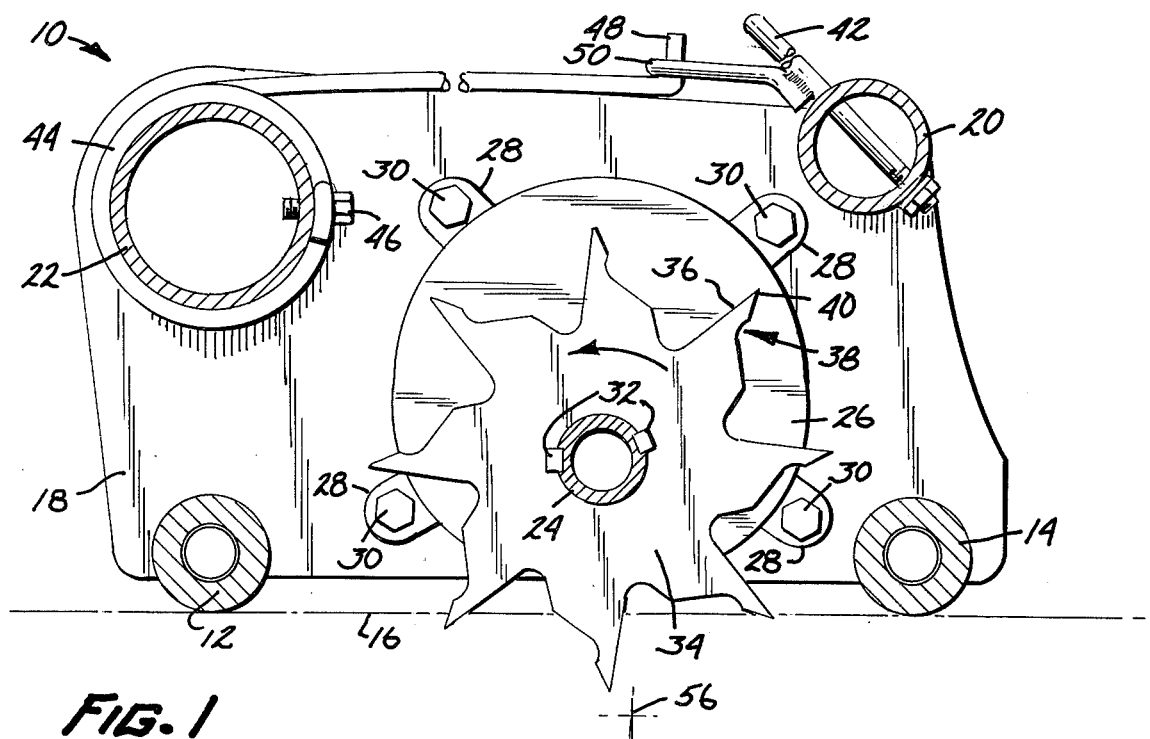
FIG. 1 is a sectioned side elevational view of a turf spiker assembly showing one embodiment of a spiker blade constructed according to the present invention.
FIG. 2 is a greatly enlarged fragmentary view of a portion of the spiker blade of FIG. 1 with emphasis on the tooth profile to illustrate the important features of the profile characterizing the present invention.

While the invention will now be described in connection with preferred embodiments thereof, it will be understood that the invention is not limited in scope to those embodiments. On the contrary, all alternatives, modifications and equivalents included within the spirit and scope of the invention as defined by the appended claims are covered.

DETAILED DESCRIPTION OF THE INVENTION

Turning first to FIG. 1, there is shown in section a turf spiker assembly generally designated 10. Although a specific embodiment of a turf spiker assembly is shown and described in connection with the present invention in the sectional view of FIG. 1, it should be clearly understood that the spiker blade construction of the present invention is not limited to use with such an assembly. In fact, any spiker in which the spiking blades rotate into contact with the turf surface for the purpose of spiking could be adapted for use with the present invention.

Turf spiker assembly 10 is illustrated with a section taken vertically through the turf spiker near one of the frame members thereof. Turf spiker assembly 10 rides on front and rear supporting rollers 12 and 14 respectively. Supporting rollers 12 and 14 provide rolling contact between turf spiker assembly 10 and a ground surface 16 defined by turf to be spiked. Assembly 10 includes two generally vertical frame members 18, only one of which is shown in the sectional view of FIG. 1. Extending horizontally and generally parallel between the two frame members are a tubular member 20, a spring tube 22 and front and rear supporting rollers 12 and 14. Tubular member 20, spring tube 22, rotatable shaft 24, and front and rear supporting rollers 12 and 14 are all shown in section in FIG. 1.

Mounted generally parallel to member 20, spring tube 22 and rollers 12 and 14 is a rotatable shaft 24. One end of rotatable shaft 24 is received in a one way slip clutch gear box 26. Gear box 26 is fastened to frame or housing 18 by means of a number of ears 28 extending outward from gear box 26 through which bolts 30 fasten into frame 18. The opposite end of rotatable shaft 24 may extend through bearing means in the frame member opposite frame member 18.

Considerable drawbar force, that is, force exerted in a direction parallel to ground surface 16, is required to move turf spiker assembly 10 forward and rotate the spiker blades of assembly 10 when the blades are in a penetrating position.

Due to this significant drawbar force requirement, the traction unit used to move the assembly may not be able to develop enough traction to smoothly move the assembly depending upon the turf condition, moisture content, soil type and other factors. Therefore it may be desirable to apply power to rotatable shaft 24 from gear box 26 through conventional power transfer means not shown in the figure. In this way, the drawbar force exerted on the turf spiker assembly by the traction unit with which it is used may be supplemented by additional drawbar force supplied by powering rotatable shaft 24.

Since the purpose of the turf spiker is to penetrate the ground surface rather than till it, it is vital that rotatable shaft 24 be powered to drive the spiker blades at a rate less than or equal to the forward motion of the tractor or prime mover with which the spiker assembly is used. In the turf spiker assembly shown in FIG. 1, this is accomplished by use of a gear box 26 with one way slip clutch which allows the rotatable shaft 10 to "free wheel" with no appreciable drag when the turf spiker assembly is pulled at a speed faster than it would normally travel under its own power.

Also, to assure that the traction unit is not driven by the power provided to the rotatable shaft, the gear box and associated power train may be designed to drive the spiker blades at a speed less than the resultant speed of the traction unit. For example, in one embodiment, the resultant speed of the spiker blades was designed to be 93% of or, 7% less than, the speed of the traction unit.

Keyed or otherwise fixed to rotatable shaft 24 by means of keys 32 is a spiker blade 34 constructed according to a preferred embodiment of the present invention. Although only one spiker blade 34 is shown in the sectional view of FIG. 1, it should be understood that a number of such spiker blades, say 8 or 10, would in the assembly be spaced along rotatable shaft 24 in different orientations to distribute the forces required for penetration and movement as evenly as possible over each revolution of shaft 24. Spiker blade 34 may be cut from a sheet of high carbon steel in a shape generally as shown in FIG. 1 or may be made from any other suitable material with strength and hardness appropriate to maintain its cutting edges. In one embodiment the spiker blades 34 were made from soft annealed, cold rolled steel 0.109 inch thick, then heat treated to give sufficient hardness.

Each spiker blade has a number of spiking teeth located about the periphery thereof. The teeth extend generally radially from the center of a hole provided for mounting of the blade on rotatable shaft 24. The normal direction of rotation of spiker blade 34 and rotatable shaft 24 is shown by an arrow on the blade 34.

In the particular embodiment shown, each tooth has a profile defined by a leading edge which is essentially a straight line segment and a trailing edge which includes a number of segments. One of the teeth on blade 34 has the leading edge thereof designated by reference numeral 36, and its trailing edge designated by reference numeral 38. These two edges meet to define a tooth tip 40. The details of spiker tooth construction and functions performed by various tooth segments are discussed in more detail in connection with FIG. 2.

Attached to tubular member 20 is a U-shaped lift bail 42. In FIG. 1, the U of the bail is in a plane substantially perpendicular to the plane of the figure. The lift bail receives a lift arm or lifting linkage (not shown) attached to the traction unit for lifting the turf spiker assembly from contact with the ground during turns or other times when spiking of turf is not desired.

Because turf spiker assembly 10 must exert a substantial downward force in order for the spiker blades to penetrate the ground surface, either the turf spiker must be heavily weighted or some downward force must be transferred to the assembly.

In the embodiment shown in section in FIG. 1, this is accomplished by means of a torsion spring arrangement which transfers forces from the traction unit to the spiker assembly. One end of a torsion spring 44 on turf spiker assembly 10 is fastened to spring tube 22 by means of a spring anchor bolt 46. Torsion spring 44 is helically wound about spring tube 22. The end of torsion spring 44 opposite the end anchored by bolt 46 extends generally tangentially outward from spring tube 22 and ends in a hooked portion 48. Hooked portion 48 extends through a U-shaped bracket 50 attached to tubular member 20 to a position proximate lift bail 42.

When the lift arm on the traction unit (not shown) raises assembly 10 by lift bail 42 to discontinue spiking, hooked portion 48 bears against bracket 50. However, when the lift arm lowers the turf spiker assembly to the ground surface the lift arm may engage hooked portion 48, effectively providing a point against which torsion spring 44 can flex and transfer its stored force through assembly 10 to the spiker blade teeth to aid in effective penetration of the ground surface.

FIG. 2 is a greatly enlarged fragmentary view of a portion of spiker blade 34 constructed in accordance with the present invention. Spiker blade 34 has a center of rotation 56. Extending from center of rotation 56 to tooth tip 40 is a radial line which will, for purposes of this specification, be defined as a tooth axis 58. To the right of tooth axis 58 is entrance edge 36 which, together with trailing edge 38, defines the tooth profile. Entrance edge 36 is in the specific embodiment shown essentially a straight cutting edge. Trailing edge 38, on the other hand, is constructed from a number of individual segments. Beginning from tooth tip 40 these segments include a piercing segment 60, which in the figure is a straight line segment making a sharp acute angle with tooth axis 58, a curved undercut segment 62 extending slightly back toward tooth axis 58 from a point of greatest width of piercing segment 60, and a counterdepression segment 64, which is a generally straight line segment in the figure.

Counterdepression segment 64 is directed more tangentially to the rotation center 56 than is piercing segment 60. Therefore, the portion of the tooth profile bounded by counterdepression segment 64 increases in thickness at a faster rate than the portion bounded by piercing segment 60.

Stated another way, counterdepressionn segment 64 makes a substantially greater angle with tooth axis 58 than does piercing segment 60.

Those of skill in the art will understand that the "ruffling" effect or migration of material caused by spiking will be minimized by minimizing the angle through which the tooth rotates while in contact with the turf and by minimizing the ratio $d/r$ where $d$ is the intended depth of tooth penetration, and $r$ is the distance between the center of rotation of the spiker blade and the tooth tip. In order that counterdepression segment 64 may provide a place for the ruffled material to be deposited below the ground surface, the position of the counterdepression segment with respect to the remainder of the tooth profile is preferably maintained within predetermined limits. It has been found that the spiker blades constructed according to the present invention function more desirably if the position of the beginning of the counter-depression segment described as the limits of the distance P between the beginning of the segment and the center of rotation of the blade (identified by dotted line 66 in FIG. 2), is as follows:

$$(r - 0.90d) \leq P \leq (R - 0.55d) \quad (1)$$

Where $r$ is the distance from the center of rotation to the tooth tip and d is the intended depth of spike penetration. From industry standards, d will normally be between 0.75 inches and 2.50 inches. The constants 0.90 and 0.55 in the expressions above are the percentages of depth of spiker penetration that will not be disturbed by intrusion of the counterdepression edge. Stating the limits of P in words, the counterdepression segment functions most effectively to provide a counterdepression for deposit of ruffled material if it penetrates at least 10% of the total depth of spiked penetration, but it should not penetrate such a substantial portion of the total depth of penetration that in effect becomes a broad piercing segment.

The relative angle of the counterdepression edge is also extremely important. Turf and dirt displaced from the counterdepression area must be displaced in a downward direction to prevent ruffling ahead of the counterdepression area from occurring. The relative angle A of the counterdepression edge controls the direction of displacement. The angle A may be defined as the angle between counterdepression segment 64 and a straight line between the blade center of rotation and the beginning of the counterdepression segment (dotted line 66 in FIG. 2). The preferred range for the relative angle A is as follows:

$$(\text{Arcsin } \frac{r-d-.15''}{P}) - 30° \leq A \leq \text{Arcsin } \frac{r-d}{P} \quad (2)$$

It should be noted that the constant 0.15 inches appears in this equation. This represents the maximum possible necessary ground clearance of the counterdepression segment. Expression (2) defines the limits within which the relative angle A can fall and still not significantly affect the direction that the material from the counterdepression segment is displaced, consistent with the limits placed on P by Expression (1).

Expression (2) means that the relative angle of the counterdepression segment must be small enough so that the counterdepression segment is not below the ground surface when the segment is horizontal, yet large enough so that the counterdepression dirt does not itself cause "ruffling."

To provide the most clearance for the spiker tooth as it rotates through the angle during which it is in contact with the ground surface, the value of the angle B between the tooth axis and the line from tooth tip 40 to the beginning of counterdepression segment 64 is important. The smaller this angle is, the more clearance is allowed. However, one can see that if this angle were selected too small the strength of the spiking tooth tip would be unacceptable. It has been determined that it is preferable to maintain this angle B less than or equal to 15 degrees, consistent with sufficient strength in the tooth tip to perform the spiking task.

In order to assure that the counterdepression segment results in an effective counterdepression area, it is desirable to maintain the length "L" of the counterdepression segment with preferred limits. These limits are set forth in the following expressions:

$$L \geq P \cos A - (r-d) \sin (\text{Arccos } \frac{r-d-.15''}{r-d}) \quad (3)$$

$$L \leq P \cos A + (r-d) \sin (\text{Arccos } \frac{r-d-.15''}{r-d}) \quad (4)$$

If "L" were longer than the upper limit shown in expression (4), the counterdepression segment would tend to roll back down into the turf as the tooth completed its intended rotation. On the other hand if "L" were shorter than the lower limit which appears in expression (3), the counterdepression segment would not continue to and rise above the turf surface smoothly.

It should be clearly understood that the limits specified above are only preferred ranges for specific embodiments of the present invention. It is not necessary to the present invention that the spiker blade be constructed within all of the above limits. What is necessary is that the blade teeth be followed by some sort of counterdepression segment which creates a depression area by predominately compression force on the turf surface so that ruffled material lifted by the lower part of the tooth as it rotates through the earth may be deposited in the counterdepression area.

FIGS. 3 and 4 illustrate the operation of the present invention by contrasting sequential positions of a portion of a blade constructed according to the present invention with those of a prior art blade as turf spikers with the blades move from left to right across a ground surface 70.

FIG. 4 illustrates a prior art star-wheel spiker blade and its effect on the turf and ground surface. The sequence of tooth positions in FIGS. 3 and 4 are alphabetically labeled. Referring to FIG. 4, in position A the spiker blade tooth is beginning to pierce and penetrate surface 70 and is cutting into and downward through the ground surface. Positions B, C, and D show successive stages of greater penetration as the tooth moves downward and rotates toward a vertical position in the soil. At point E the blade is centered in the depression with the blade center of rotation directly over the tooth tip. Through the sequence of positions A, B, C, D, and E the turf and surrounding soil are put in compression by the movement of the tooth tip downward and forward into the turf. Continuing from position E in a cycloidal path, the tooth tip moves backward then forward and upward eventually clearing the ground surface. In so doing, the tooth sweeps out an area marked by crosshatching and identified with reference numeral 72. In positions occurring subsequent to position E, the trailing edge of the tooth is moving forward and upward. Friction between the trailing edge and the turf and soil draws the material previously in crosshatched area 72 forward of the hole above the ground surface to create a ruffle 74. This is the undesirable ruffle which the spiker blade construction in accordance with the present invention eliminates.

Referring now to FIG. 3, sequential positions of a portion of a spiker blade with teeth constructed according to the present invention are shown. In positions A, B, C, and D the entrance edge and the piercing segment of the trailing edge of a tooth pierce, penetrate and compress the turf and surrounding soil creating the basic depression. At positions D and E the counterdepression segment begins to contact and create a downward compression force on the ground surface slightly forward of the basic depression. As in FIG. 4, position E is the position at which the tooth tip is directly under the center of rotation of the spiker blade. After position E, the blade tooth tip rotates in cycloidal fashion backward then upward and forward and is lifted out of the hole by rotation of the spiker blade. As this occurs however, the counterdepression segment continues to move downward compressing an area shown by a crosshatched area 76. This provides a counterdepression immediately forward of the basic hole for deposit of material lifted by the spiker tooth as it is removed from the hole. From FIG. 3, it will be seen that the undercut segment of the trailing edge of the tooth allows the tooth to sweep out a significantly smaller area as it is being withdrawn from the hole. A crosshatched area identified with reference numeral 78 represents the area from which material will be displaced by the tooth upward and into the counterdepression area. Unlike the action of the spiker tooth of FIG. 4, the action of the spiker tooth of FIG. 3 creates no above-ground surface ruffle. The material previously present in area 78 is redeposited in counterdepression 76 below the ground surface. It is apparent that the improved spiker blade accomplishes spiking without creating ruffling at the turf surface.

From the foregoing description, it should be understood that it is not essential that the piercing or counterdepression segments of the trailing edge be straight line segments. It is sufficient that the piercing segment be configured to give as narrow as possible a tooth tip to minimize the amount of area swept out by the tooth tip, at the same time minimizing the size of the required counterdepression; and that the counterdepression segment exert a predominantly downward compression force so that it does not in itself cause above-ground ruffling of the turf.

While the improved spiker blade has been described in conjunction with specific embodiments and ranges of parameters it is evident that a number of alternatives, modifications, and variations will be apparent to those of skill art in light of this description. Accordingly, it is intended to embrace all alternatives, modifications and variations falling within the spirit and broad scope of the appended claims.

What is claimed is:

1. A spiker blade for mounting on a rotatable shaft of a turf spiker assembly to break a ground surface and facilitate penetration of air, water and nutrients through the ground surface comprising:
   a. blade means having a center of rotation and a plurality of teeth spaced about the periphery thereof, each tooth having a profile defined by a leading and a trailing edge which meet to form a tooth tip, said trailing edge having two segments thereon;
   b. a piercing segment leading upward from the tooth tip which, together with said entrance edge, forms a tapered profile proximate said tip; and
   c. a counterdepression segment above said piercing segment and directed outward from a line between the center of rotation and the tooth tip at a faster rate than said piercing segment so that the portion of the tooth profile bounded in part by said counterdepression segment increases in thickness at a rate faster than the portion bounded in part by said piercing segment.

2. The apparatus of claim 1 wherein said trailing edge has an undercut segment located between said counterdepression segment and said piercing segment.

3. The apparatus of claim 1 wherein the distance P between said center of rotation and the point on said counterdepression segment nearest said tooth tip is within the range $(r-0.90d) \leq P \leq (r-0.55d)$ where
   $r$ = the radius of each tooth tip from said center of rotation, and
   $d$ = the intended depth of tooth penetration.

4. The apparatus of claim 3 wherein said counterdepression segment is substantially a straight line segment and the angle A between said counterdepression segment and a straight line between the point on said counterdepression segment nearest said tooth tip and said center of rotation is in the range $$\text{Arc Sin } \frac{(r-d-.15'')}{P} - 30° \leq A \leq \text{Arc Sin } \frac{(r-d)}{P}.$$

5. The apparatus of claim 4 wherein the angle B between a line from said center of rotation to said tooth tip and from said tooth tip to the point on said counterdepression segment nearest said tooth tip is less than or equal to 15°.

6. The apparatus of claim 4 wherein the length L of said counterdepression edge is in the range $$L \geq P \cos A - (r-d) \sin (\text{Arccos } \frac{r-d-.15''}{r-d})$$

$$L \leq P \cos A + (r-d) \sin (\text{Arccos } \frac{r-d-.15''}{r-d})$$

7. In a spiker blade with a plurality of teeth radiating outwardly from a predetermined blade axis, said spiker blade being adapted for mounting on a rotatable shaft for rotation in a predetermined direction with its blade axis aligned with the shaft axis, each tooth of said blade having a tooth tip thereon, said tooth tips having predetermined widths in a direction parallel to said shaft axis, the improvement which comprises:

counterdepression means trailing each tooth tip when rotation of said blade in said predetermined direction occurs, said counterdepression means being of width at least equal that of the corresponding tooth tip in a direction parallel to said shaft axis, for creating counterdepression areas in the ground surface immediately adjacent depressions to be created by said tooth tips, for deposit of material lifted by said tooth tips from said depressions during spiking operation.

8. The structure of claim 7 wherein said counterdepression means comprise a straight line counterdepression segment on the trailing edge of each tooth.

9. The structure of claim 8 wherein the trailing edge of each tooth further includes a piercing segment leading upward from said tooth tip and an undercut segment between said piercing and counterdepression segments, all of said undercut segment lying within an area bounded in part by the extension of said piercing segment upward from said tip.

* * * * *